(12) United States Patent
Anokhin

(10) Patent No.: US 12,690,696 B2
(45) Date of Patent: Jul. 28, 2026

(54) ATTACHMENT CLIP FOR ACTIVITY TABLE

(71) Applicant: Skip Hop, Inc., New York, NY (US)

(72) Inventor: Vladimir Anokhin, East Brunswick, NJ (US)

(73) Assignee: Skip Hop, Inc., New York, NY (US)

( * ) Notice: Subject to any disclaimer, the term of this patent is extended or adjusted under 35 U.S.C. 154(b) by 177 days.

(21) Appl. No.: 18/594,801

(22) Filed: Mar. 4, 2024

(65) Prior Publication Data

US 2025/0275636 A1 Sep. 4, 2025

(51) Int. Cl.
*A47D 3/00* (2006.01)
*A47D 15/00* (2006.01)
*F16B 2/22* (2006.01)

(52) U.S. Cl.
CPC .............. *A47D 3/001* (2017.05); *A47D 15/00* (2013.01); *F16B 2/22* (2013.01)

(58) Field of Classification Search
CPC ............ A47D 3/001; A47C 15/00; F16B 2/22
USPC ........................................................ 297/135
See application file for complete search history.

(56) References Cited

U.S. PATENT DOCUMENTS

| | | | | |
|---|---|---|---|---|
| 1,279,615 | A | * | 9/1918 | Van Meter ........... A63H 33/006 |
| | | | | 280/1.13 |
| 5,518,475 | A | * | 5/1996 | Garland ............... A47D 13/043 |
| | | | | 482/68 |
| 6,578,496 | B2 | * | 6/2003 | Guard ................... A47G 19/10 |
| | | | | 297/148 |
| D921,763 | S | * | 6/2021 | Aslan ............................ D6/333 |
| 11,187,353 | B1 | * | 11/2021 | Giuliano ................. F16B 2/22 |
| 2002/0027382 | A1 | * | 3/2002 | Bellows ............... A63H 33/006 |
| | | | | 297/135 |
| 2016/0338273 | A1 | * | 11/2016 | Johnson ............... A01G 27/008 |
| 2017/0232355 | A1 | * | 8/2017 | Healy ................... A47D 3/001 |
| | | | | 446/227 |
| 2017/0314732 | A1 | * | 11/2017 | Minn ...................... B60R 11/02 |
| 2017/0366131 | A1 | * | 12/2017 | Stearns ................. F24S 25/634 |
| 2018/0160837 | A1 | * | 6/2018 | Middleton ............. A47H 1/142 |
| 2018/0319207 | A1 | * | 11/2018 | Pippus ................... B44D 3/123 |
| 2018/0326573 | A1 | * | 11/2018 | Tesoroni ................. B25H 3/04 |
| 2019/0069692 | A1 | * | 3/2019 | Healy ................... A47D 1/004 |
| 2020/0056640 | A1 | * | 2/2020 | Wilcox ..................... F16B 2/20 |
| 2020/0329889 | A1 | * | 10/2020 | Wen ........................ F16B 17/00 |
| 2021/0041060 | A1 | * | 2/2021 | Kelly ..................... F16B 21/086 |
| 2021/0331631 | A1 | * | 10/2021 | Ahmed ............... B60R 16/0215 |
| 2021/0361078 | A1 | * | 11/2021 | Logan .................. A47D 11/002 |
| 2024/0155982 | A1 | * | 5/2024 | Montagano ........... F16B 5/0635 |

* cited by examiner

*Primary Examiner* — Jose V Chen
(74) *Attorney, Agent, or Firm* — Greenberg Traurig, LLP

(57) ABSTRACT

An attachment for an activity table according to the present disclosure includes a clip having a first attachment mechanism on a first end, a second attachment mechanism on a second end opposite the first end, and at least one hole shaped to receive a fastener; and an accessory having an interactive element and at least one aperture configured to receive the fastener. The first attachment mechanism is configured to insert into a corresponding slot of the activity table, and the second attachment mechanism is configured to snap fit to the activity table.

20 Claims, 21 Drawing Sheets

ATTACHMENT CLIP FOR ACTIVITY TABLE

BACKGROUND

Infants and toddlers develop physically and mentally by interacting with their environment. To this end, modular tables have been designed that are configured to present infants with different stimuli by enabling a single table to have multiple toys.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A first aspect of the present disclosure is directed to an attachment for an activity table that includes a clip and an accessory. The clip has a first attachment mechanism on a first end, a second attachment mechanism on a second end opposite the first end, and at least one hole shaped to receive a fastener. The accessory has an interactive element and at least one aperture configured to receive the fastener. The first attachment mechanism is configured to insert into a corresponding slot of the activity table, and the second attachment mechanism is configured to snap fit to the activity table.

A second aspect of the present disclosure is directed to an attachment clip for an activity table that includes a first member, a second member, and a third member. The first member has a top side, a bottom side, a first end and a second end. The second member extends from the first end generally in a first direction that is perpendicular the bottom side, and includes a flat portion coupled to the first end extending in the first direction; and a flare portion extending from the flat portion in a second direction that is angled away from the bottom side and the first end. The third member extends from the second end and includes an arcuate portion extending in an arc from the second end generally in the first direction and terminating at a third end; and a catch portion. The catch portion includes a shoulder coupled to the third end and extending toward the second end; and a release tab extending from the shoulder generally in the first direction.

A third aspect of the present disclosure is directed to an attachment clip for an activity table that includes a main body, a first attachment mechanism, and a second attachment mechanism. The main body includes a top side; a bottom side; a first end; a second end; a first edge connecting the first end and the second end; a second edge connecting the first end and the second end; a first raised portion proximate the first edge and defining a first channel that opens toward the second edge; a second raised portion proximate the second edge and defining a second channel that opens toward the first edge; and an aperture passing through the main body from the top side to the bottom side and positioned between the first raised portion and the second raised portion. The first attachment mechanism couples with the first end and extends generally in a first direction perpendicular the bottom side; and the second attachment mechanism couples with the second end and extends generally in the first direction. The first end and the second end cooperate to selectively attach the attachment clip to the activity table.

DETAILED DESCRIPTION

Reference will now be made in detail to various embodiments, examples of which are illustrated in the accompanying drawings. While this disclosure includes certain embodiments, it will be understood the disclosure is not intended to limit the claims to these embodiments. On the contrary, the disclosure is intended to cover alternatives, modifications and equivalents, which may be included within the spirit and scope of the claims. Furthermore, in this detailed description, numerous specific details are set forth in order to provide a thorough understanding. However, one of ordinary skill in the art will appreciate that the subject matter of the present disclosure may be practiced without these specific details. In other instances, well known methods, procedures, and components have not been described in detail as not to unnecessarily obscure aspects of the present disclosure.

Various embodiments of this disclosure include an attachment clip for removably coupling one or more accessories or toys to an activity table for children. In particular, the attachment clip includes a pivoting mechanism on one end and a snap-fit mechanism on the other end. After inserting the pivoting mechanism into a corresponding slot on the activity table, the snap-fit mechanism may interface within an outer edge of the activity table in order to fix the attachment clip—and associated accessory—in place on the activity table. By removably coupling in this manner, the attachment clip is able to be swapped out with other attachment clips by an adult to enhance the modular nature of the activity table, while still providing a secure coupling for a child to interact with the associated accessory.

Figure 1:
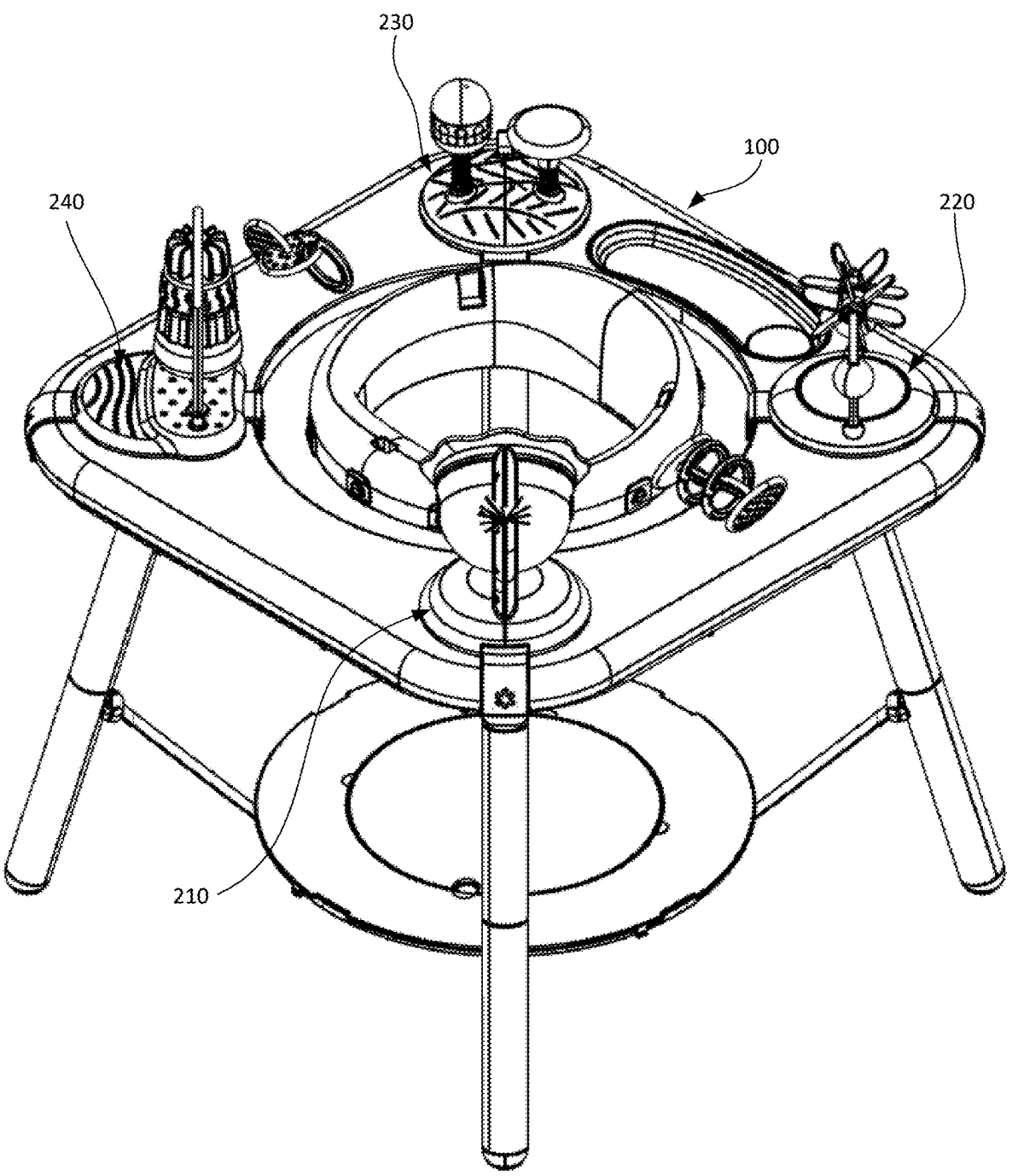
FIG. 1 is a perspective view of an activity table.
Figure 2:
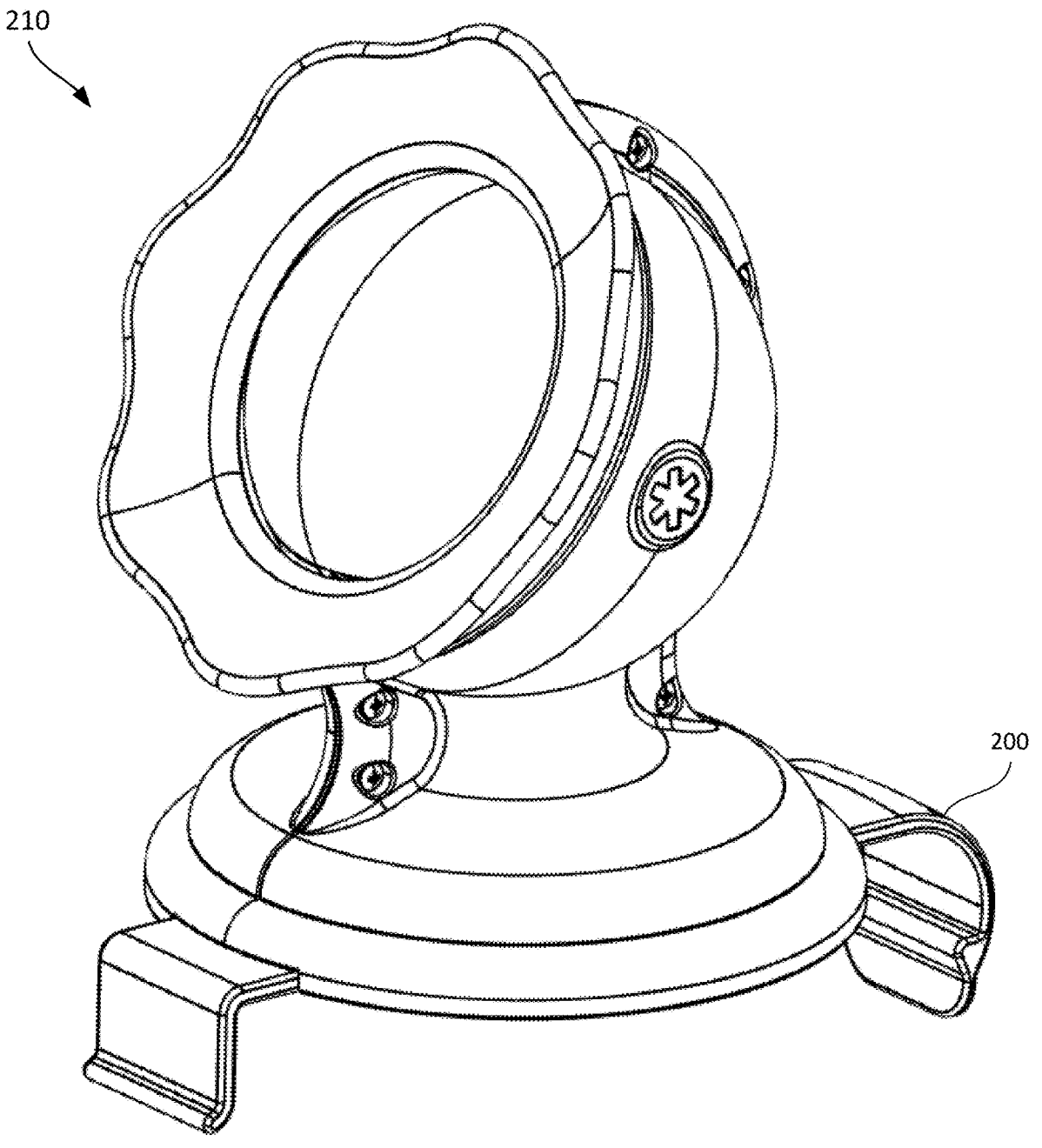
FIG. 2 is a perspective view of a first accessory of the activity table of FIG. 1.

FIG. 1 is a perspective view of an activity table 100 with four accessories: first accessory 210, second accessory 220, third accessory 230, and fourth accessory 240. As shown in FIGS. 2-5, each accessory is attached to the activity table 100 with an attachment clip 200. Each accessory may be configured to stimulate an infant's mind and/or body through interaction, such that each accessory may respond to interaction from the infant. For example, the second accessory 220 is shown to include two pinwheels that, when touched by an infant, will spin, and the fourth accessory 240 includes various shapes on a loop that can be slid along the loop. Although these four accessories are shown in FIG. 1, this disclosure should not be read as limited to these four accessories, and should be read to include any accessory or toy capable of stimulating an infant's mental or physical growth.

FIG. 6-10 are various views of the attachment clip 200. As shown, the attachment clip 200 includes three portions: an outer portion 200A (relative to a center of the activity table 100 when the attachment clip 200 is coupled to the activity table), an upper portion 200B, an inner portion 200C. Each of the outer portion 200A and the inner portion 200C is shaped to interface with a corresponding portion of the activity table, the upper portion 200B is shaped to interface with each of the accessories shown in FIGS. 2-5, and the lower portion 200D is shaped to abut the table 100.

The upper portion 200B and the lower portion 200D are defined by a length between the outer portion 200A and the inner portion 200C along a Z-axis, and are substantially flat along the length. The upper portion 200B (relative to the activity table 100) includes several components for interfacing with an accessory: a first ridge 204, a second ridge 205, and a gap 206 defined by a space across an X-axis between the first ridge 204 and the second ridge 205. Each of the first ridge 204 and the second ridge 205 extends upwards from the middle portion 200B along a Y-axis. Two clip holes 207 are positioned within the gap 206, and are configured to receive a fastener. Although only two clip holes 207 are shown, this disclosure should be read as inclusive of any number of clip holes 207. Each clip hole 207 extends entirely through the clip 200 (i.e., from the upper portion 200B to the lower portion 200D).

Figure 3:
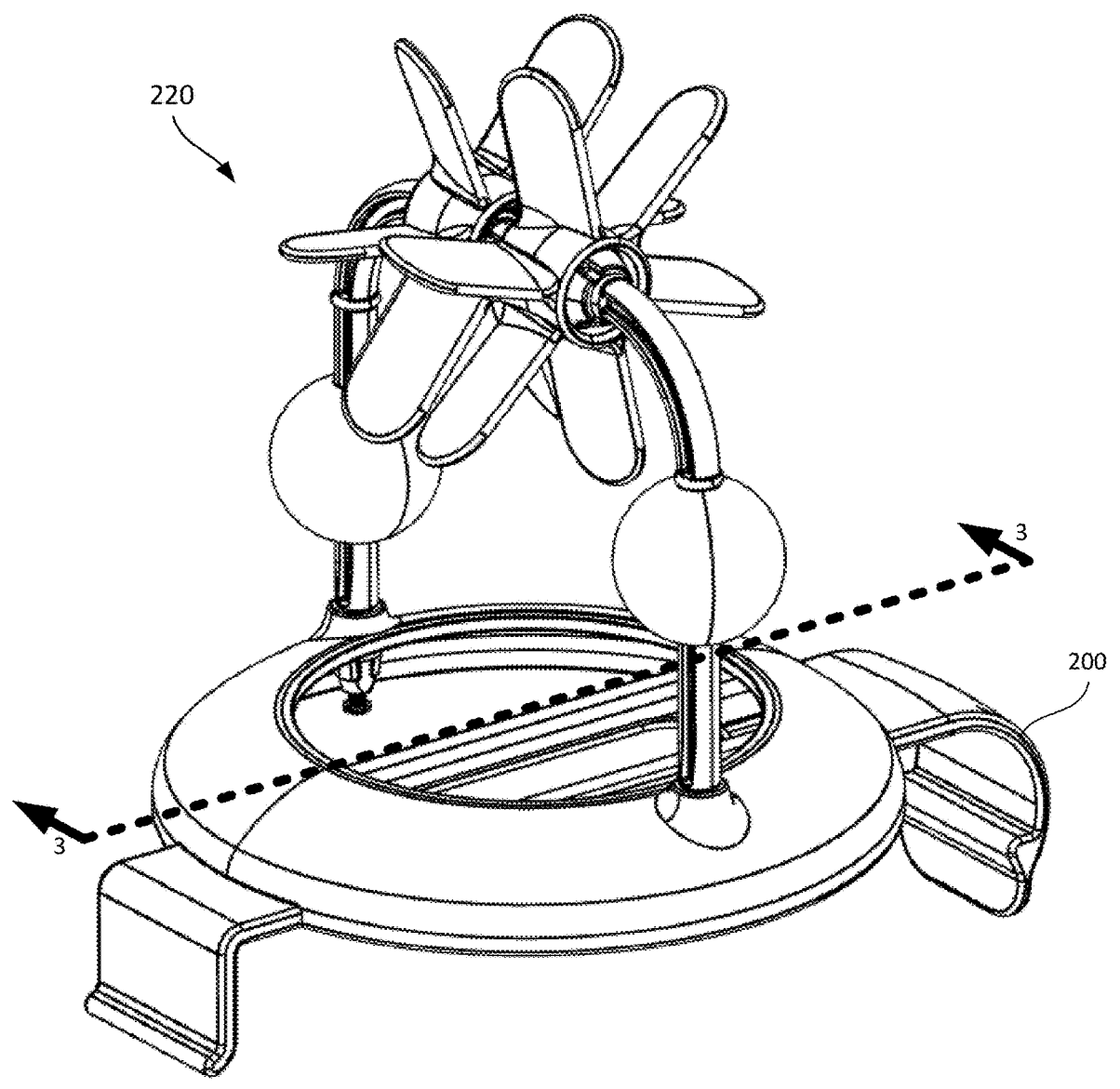
FIG. 3 is a perspective view of a second accessory of the activity table of FIG. 1.
Figure 4:
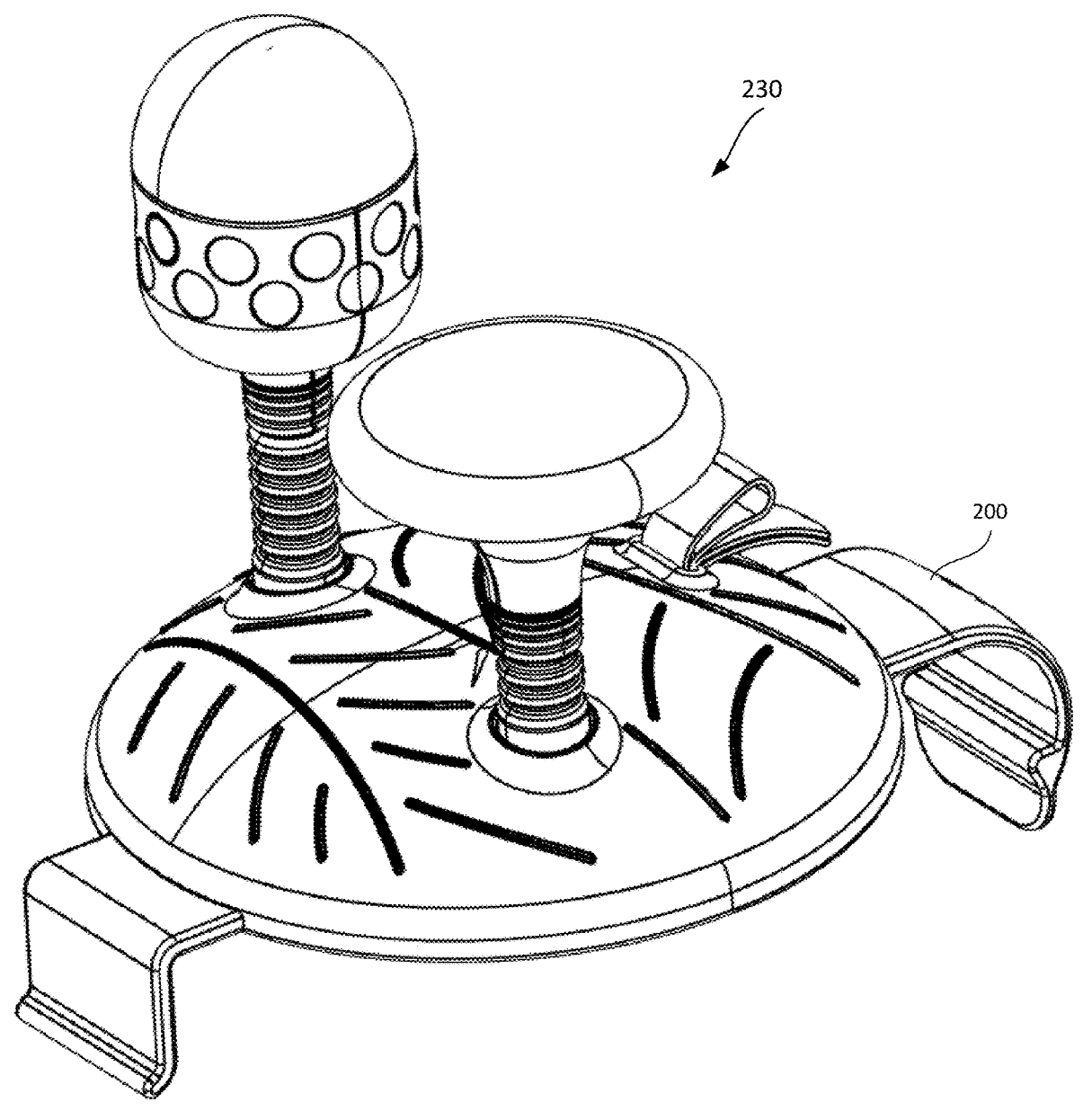
FIG. 4 is a perspective view of a third accessory of the activity table of FIG. 1
Figure 5:
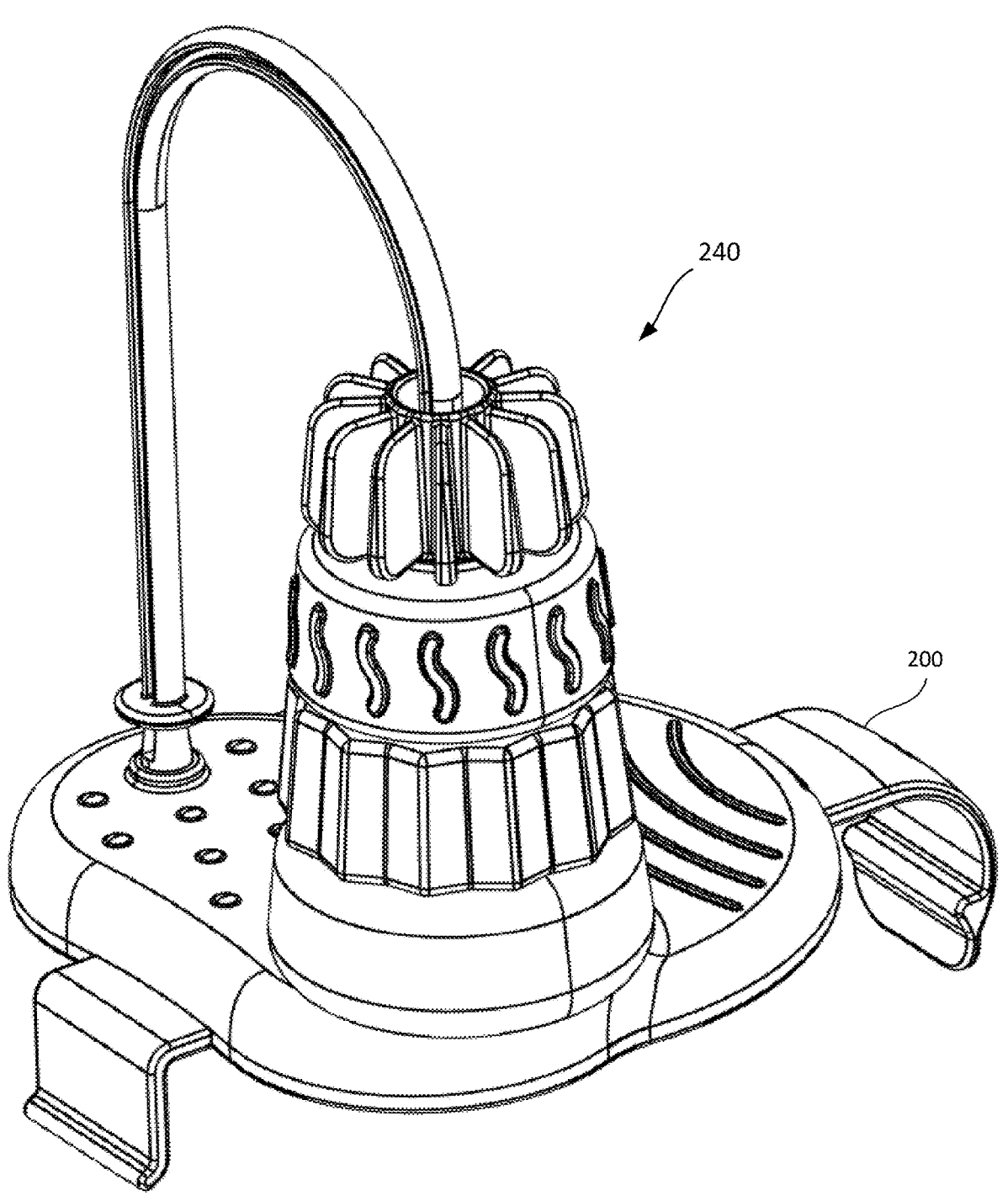
FIG. 5 is a perspective view of a fourth accessory of the activity table of FIG. 1.
Figure 6:
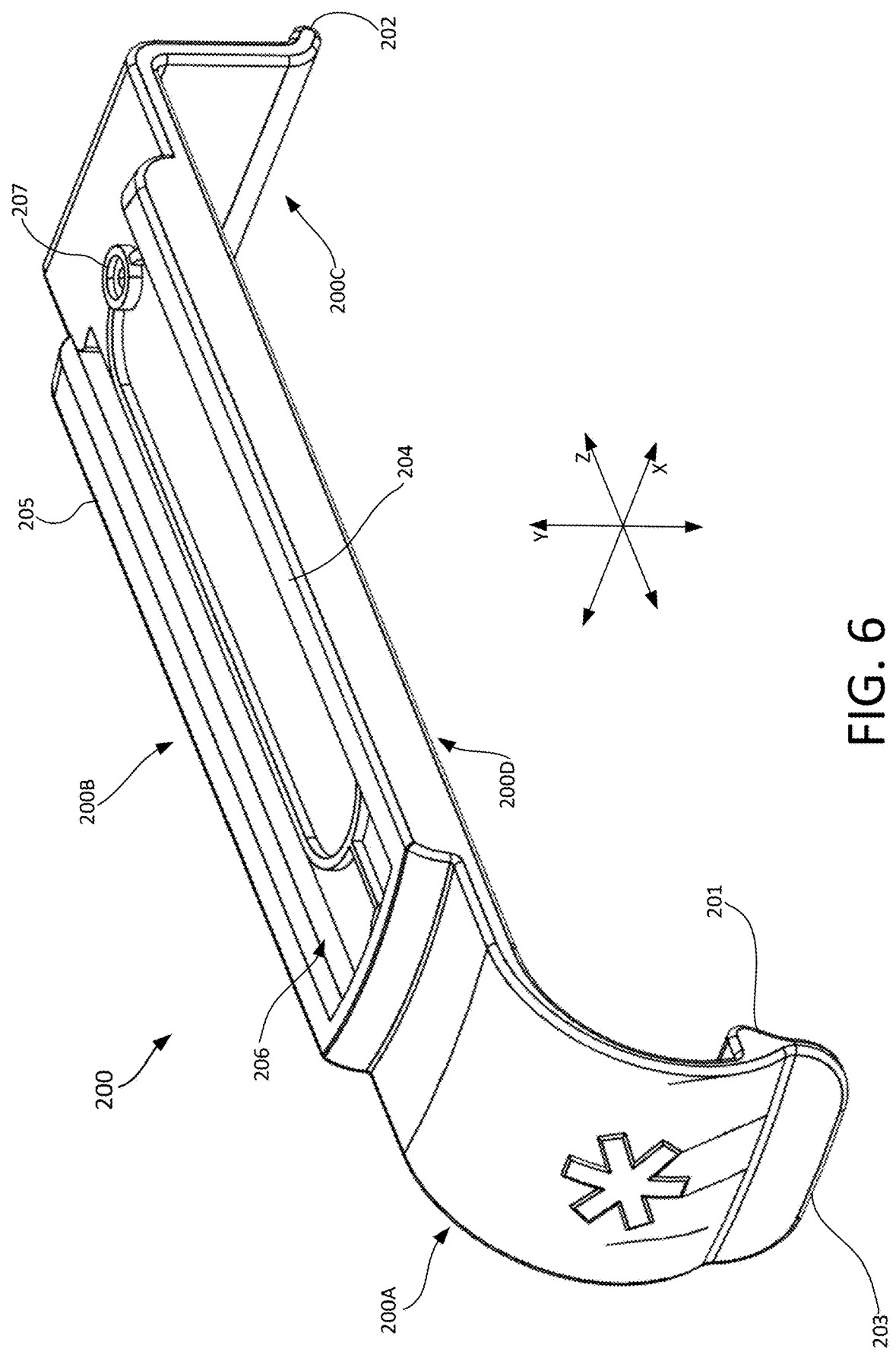
FIG. 6 is a perspective view of an attachment clip for use with the activity table of FIG. 1.
Figure 7:
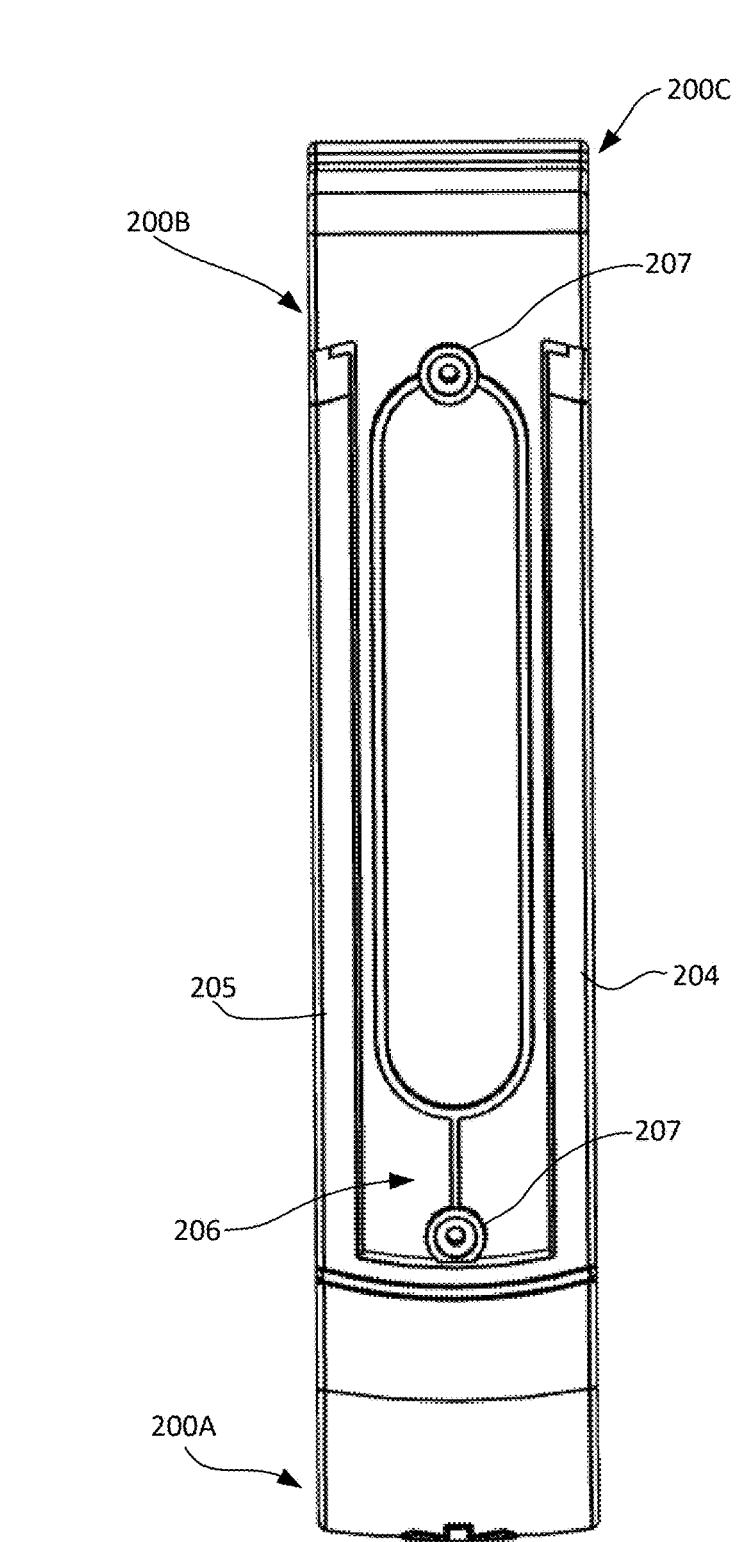
FIG. 7 is a top view of the attachment clip of FIG. 6.
Figure 8:
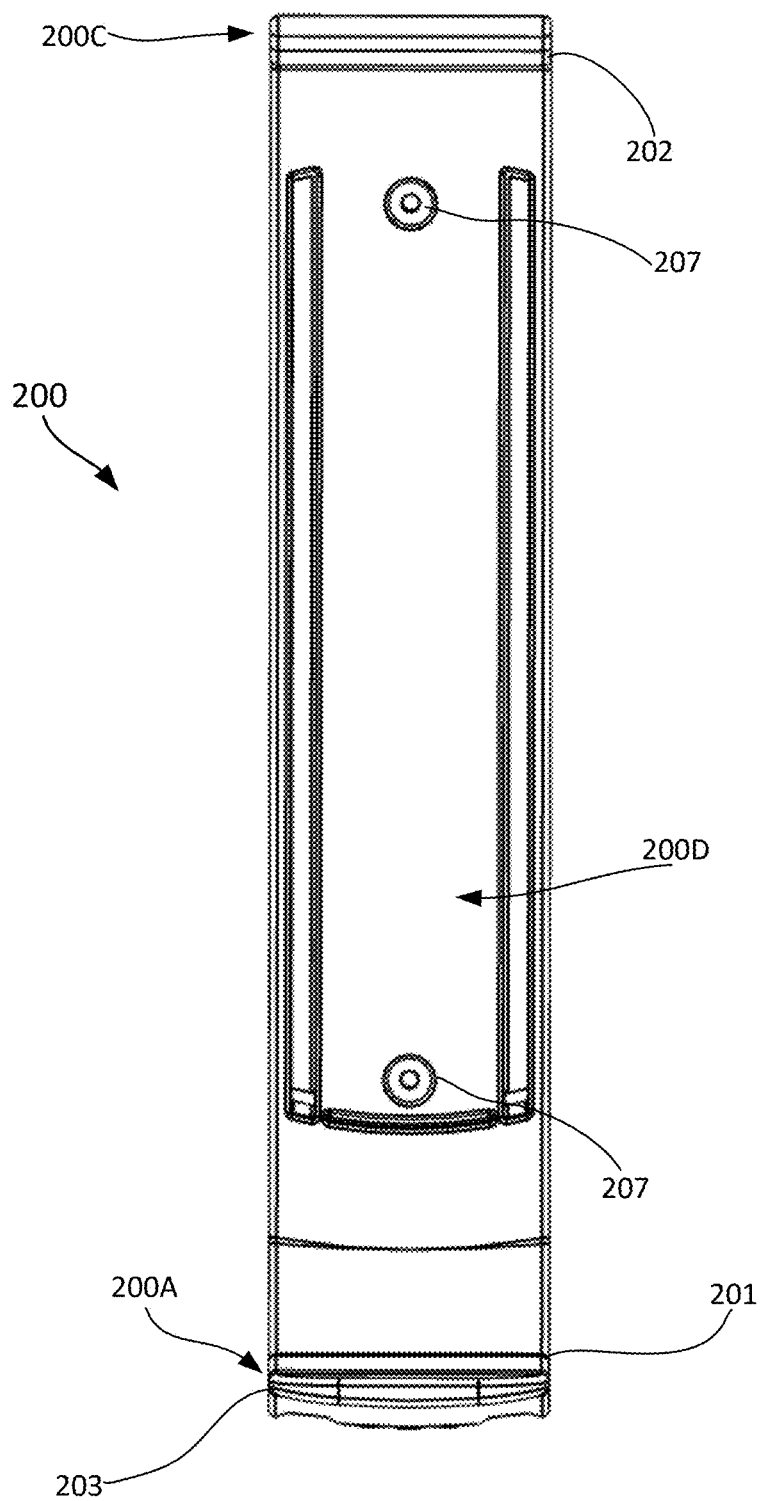
FIG. 8 is a bottom view of the attachment clip of FIG. 6.
Figure 9:
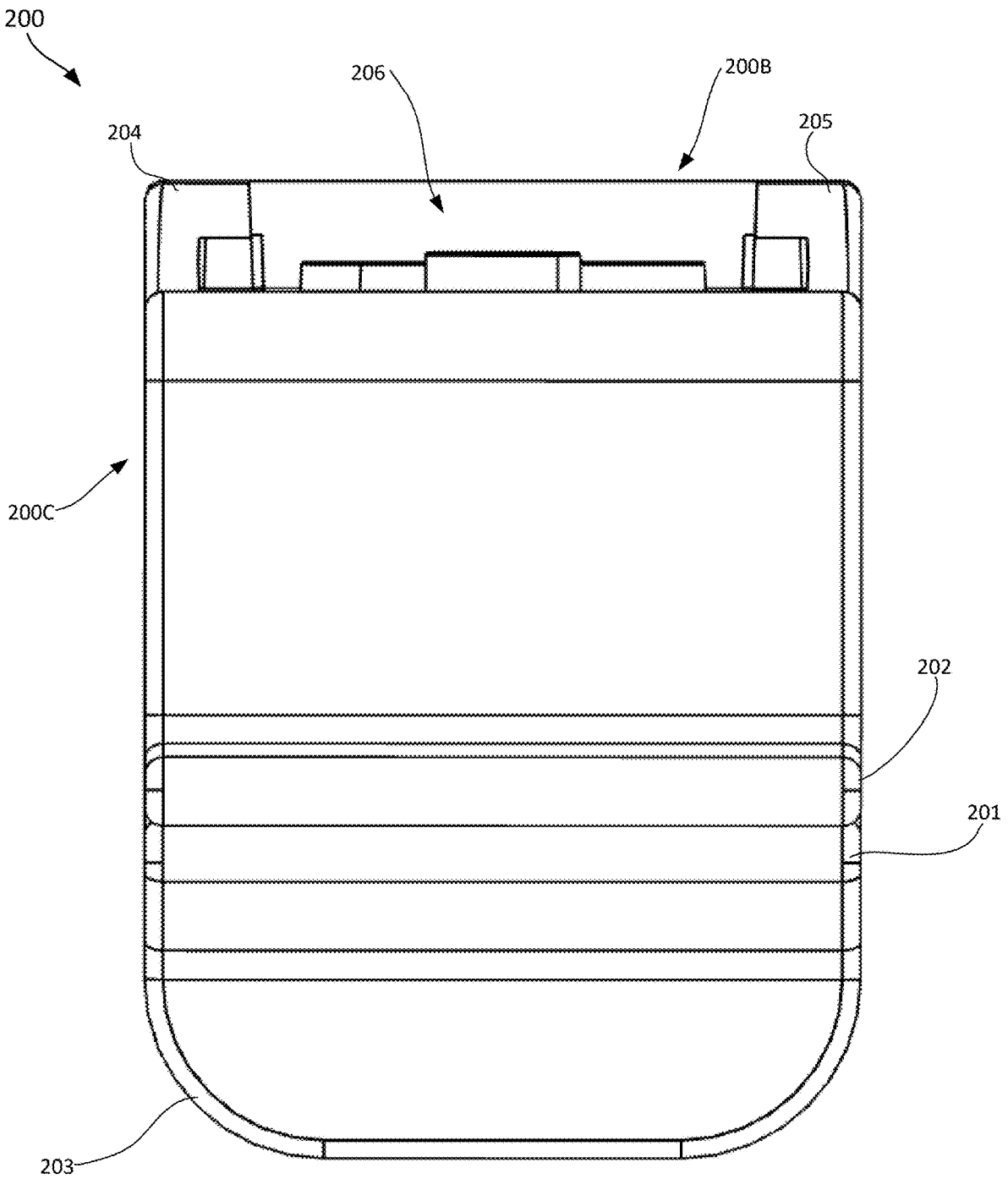
FIG. 9 is a rear view of the attachment clip of FIG. 6.
Figure 10:
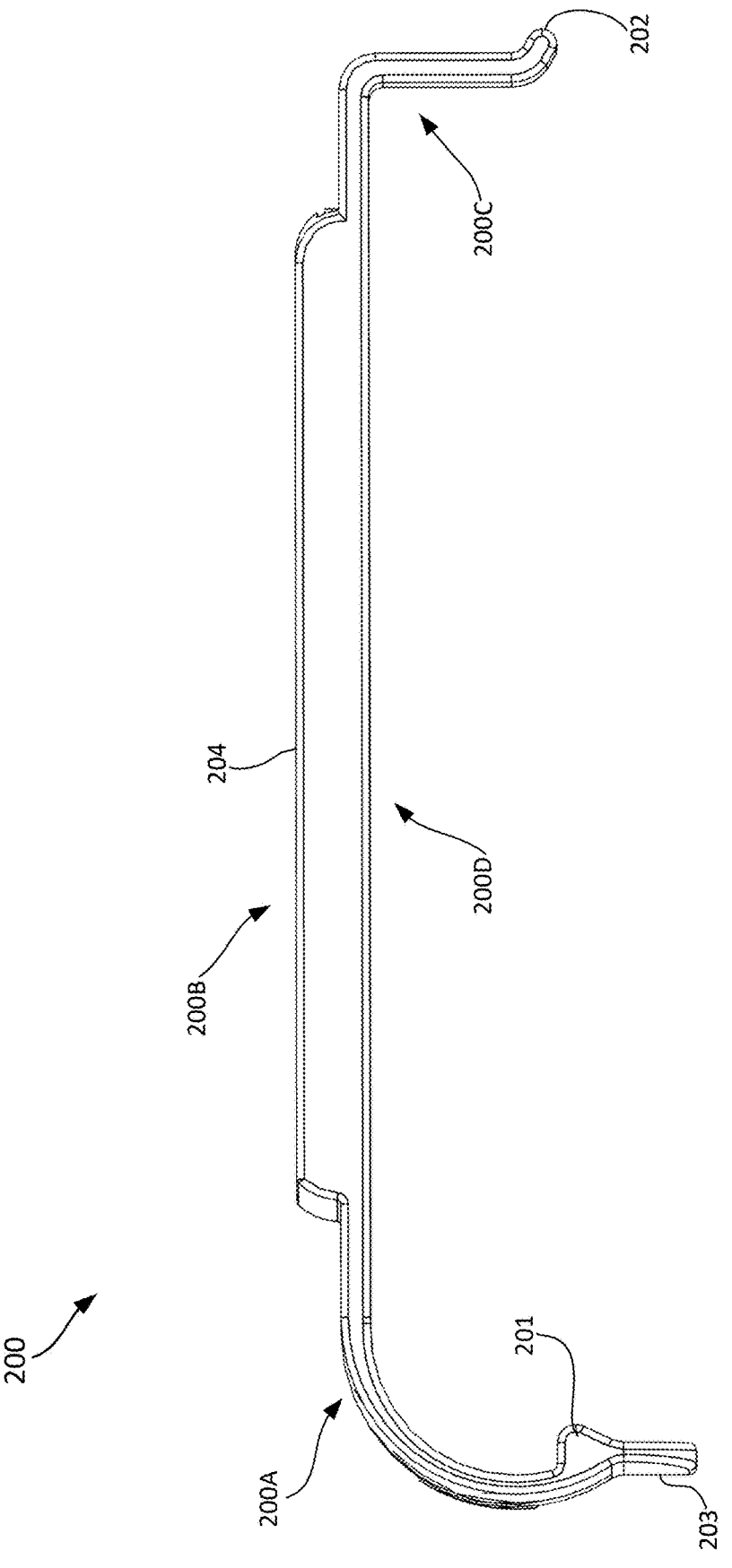
FIG. 10 is a side view of the attachment clip of FIG. 6.
Figure 11:
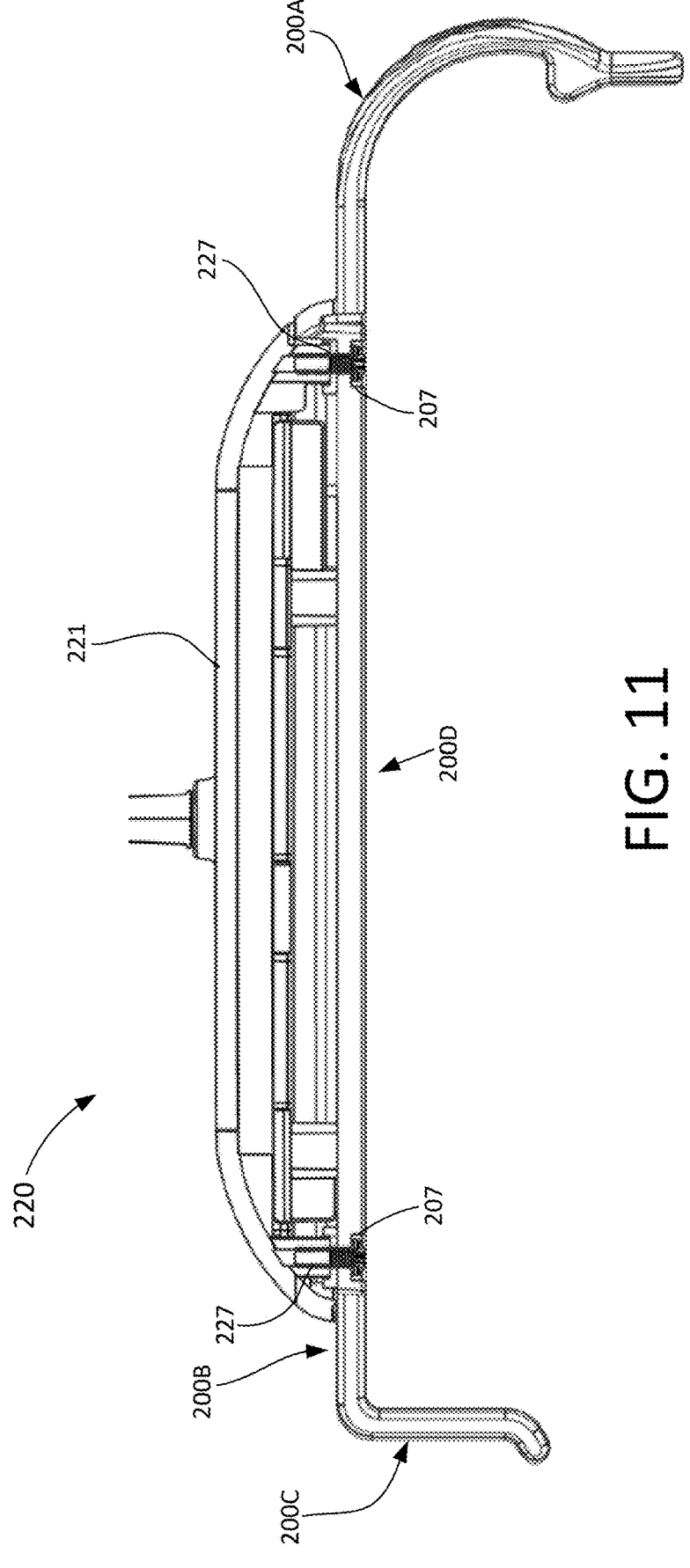
FIG. 11 is a section view of the second accessory of FIG. 3.
Figure 12:
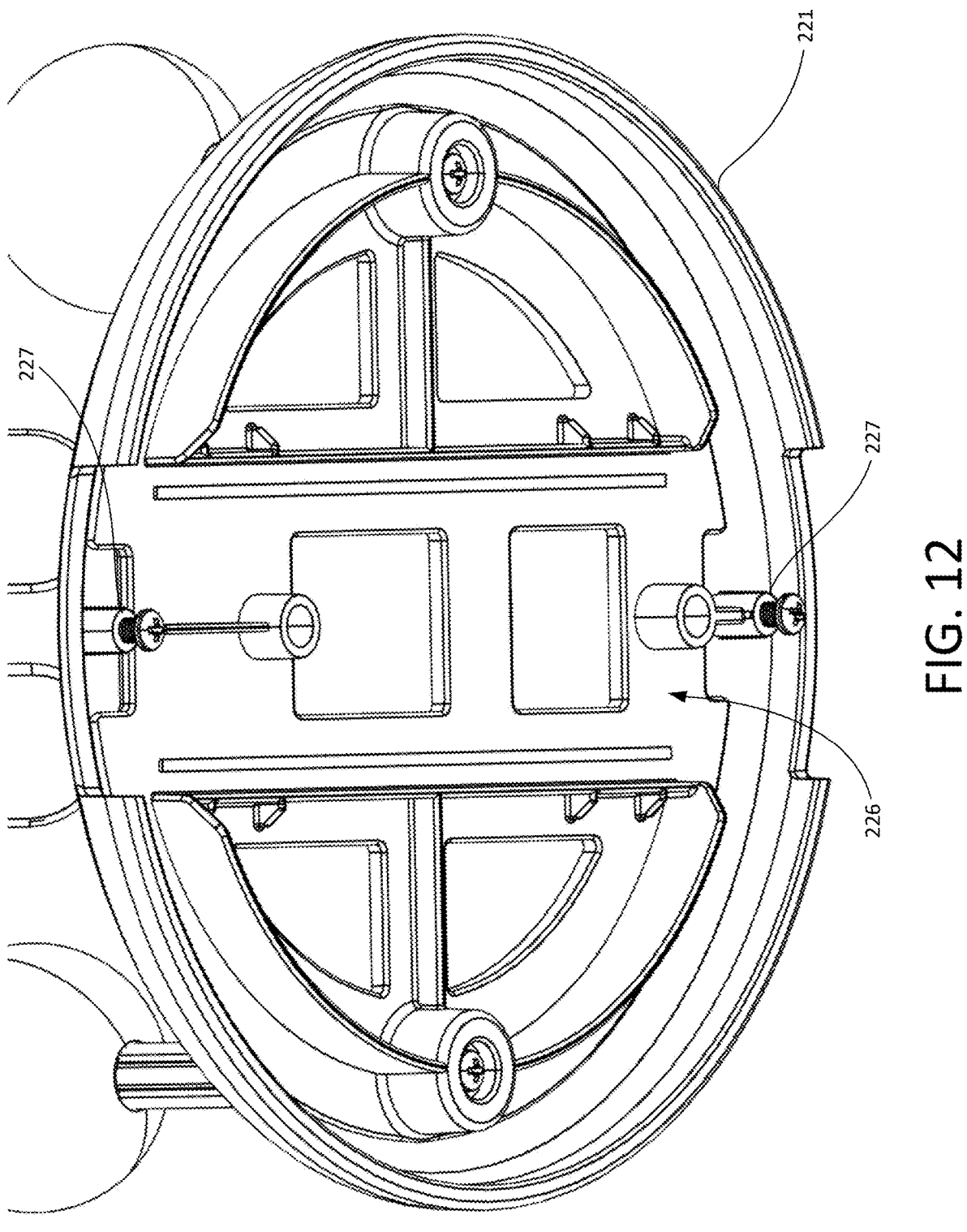
FIG. 12 is a bottom view of the second accessory of FIG. 3.

FIG. 11 is a section view of the second accessory 220 taken along line 3-3 of FIG. 3, and FIG. 12 is a bottom perspective view of the second accessory 220 without the attachment clip 200. The second accessory 220 may securely couple to the attachment clip 200 by feeding at least one fastener through at least one clip hole 207 and into an accessory hole 227 of the second accessory 220. To guide attachment, the second accessory 220 includes a gap 226 shaped to correspond to a width (along the X-axis of FIG. 6) of the attachment clip 200. Accordingly, the second attachment 220 may first be slid onto the attachment clip 200, and then fastener(s) inserted into each clip hole 207 and bound to each accessory hole 227. Although this manner of attaching the second accessory 220 to the attachment clip 200 is described only with reference to the second accessory 220, similar components and attachment mechanisms are included with each of the first accessory 210, the third accessory 230, and the fourth accessory 240.

The outer portion 200A projects away from the lower portion 200D in a direction substantially along the Y-axis. As shown, the outer portion 200A may be curved (e.g., arced or arcuate) in order to adapt with an edge of the activity table 100, such that the shape of the outer portion 200A matches the shape of the edge. Accordingly, the shape of the outer portion 200A may be different depending on a design for the associated activity table. The outer portion 200A includes a tooth 201 (or shoulder) and a grip 203 (or release tab). The tooth 201 extends along the Z-axis and is shaped to extend into or catch onto a corresponding gap (e.g., gap 110 of FIG. 14) in the activity table 100, such that the tooth 201 works with the lower portion 200D to clamp the attachment clip 200 about the activity table 100.

The grip 203 is fin-shaped and generally configured to enable a user to apply pressure in order to remove the attachment clip 200 from the activity table 100. The attachment clip 200 is constructed from a lightly-pliable material, such that the attachment clip 200 is sturdy enough to securely couple to the activity table 100 but is capable of flexing. By applying outward (e.g., along the Z-axis) pressure to the grip 203, a user causes the outer portion 200A to flex outwards (relative to the upper portion 200B), which in turn causes the tooth 201 to move outwards and disengage from the activity table 100. Accordingly, the grip 203 may function as a release tab for the attachment clip 200.

Figure 13:
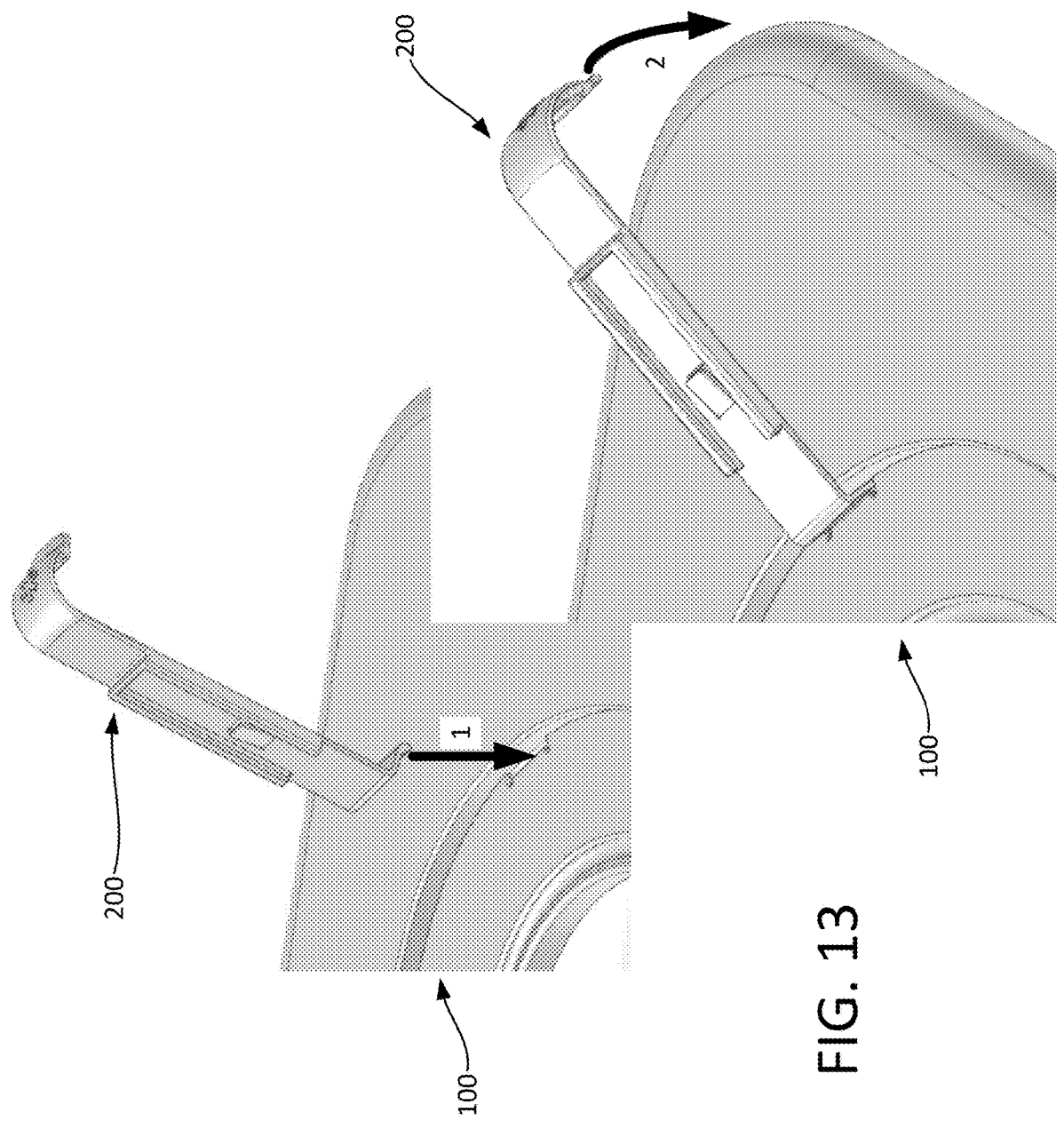
FIG. 13 is a process view of the attachment clip of FIG. 6 in use with the activity table of FIG. 1.

The inner portion 200C projects away from the lower portion 200D in a direction substantially along the Y-axis—similarly to the outer portion 200A. In contrast to the outer portion 200A, the inner portion 200C is mostly straight with a slight curve at the end that flares out to form a clip insert 202. The clip insert 202 is shaped to extend into a corresponding slot (e.g., slot 120) of the activity table 100 to form a pivot point for the attachment clip 200. The slight curve (along the Z-axis) of the clip insert 202 enables the attachment clip 200 to insert into the slot 120 in a first rotational orientation (e.g., about the X-axis) and to rotate to a second rotational orientation in which the lower portion 200D is flush with the activity table 100. This two-step attachment process is shown in FIG. 13, with the insertion of the clip insert 202 into the slot 120 indicated by arrow 1 and the rotation of the attachment clip 200 about the clip insert 202 indicated by arrow 2. In the second rotational orientation, the extension of the clip insert 202 into the activity table 100 works to restrict movement of the attachment clip along the Y-axis.

Figure 14:
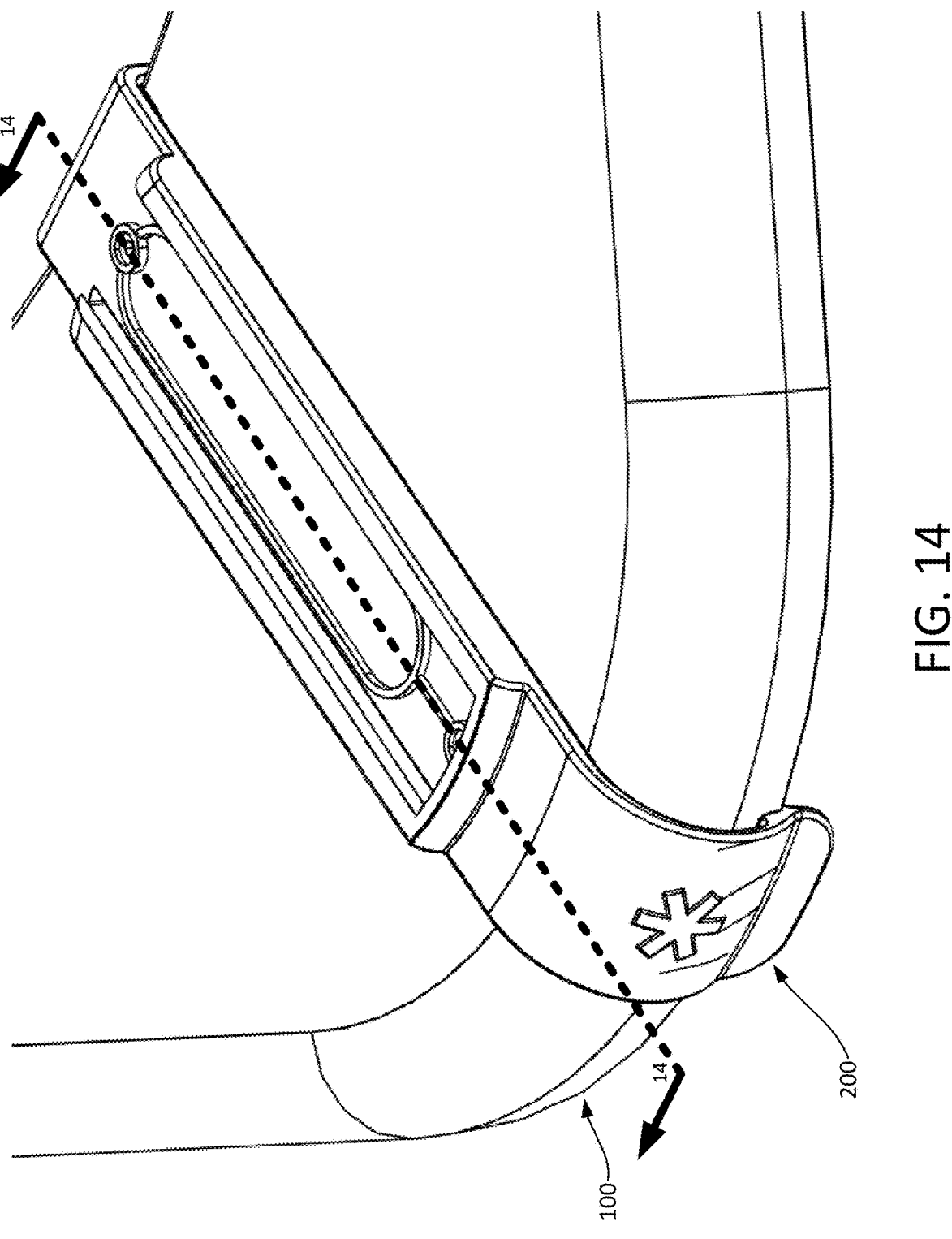
FIG. 14 is a detailed view of the attachment clip of FIG. 6 in use with the activity table of FIG. 1.
Figure 15:
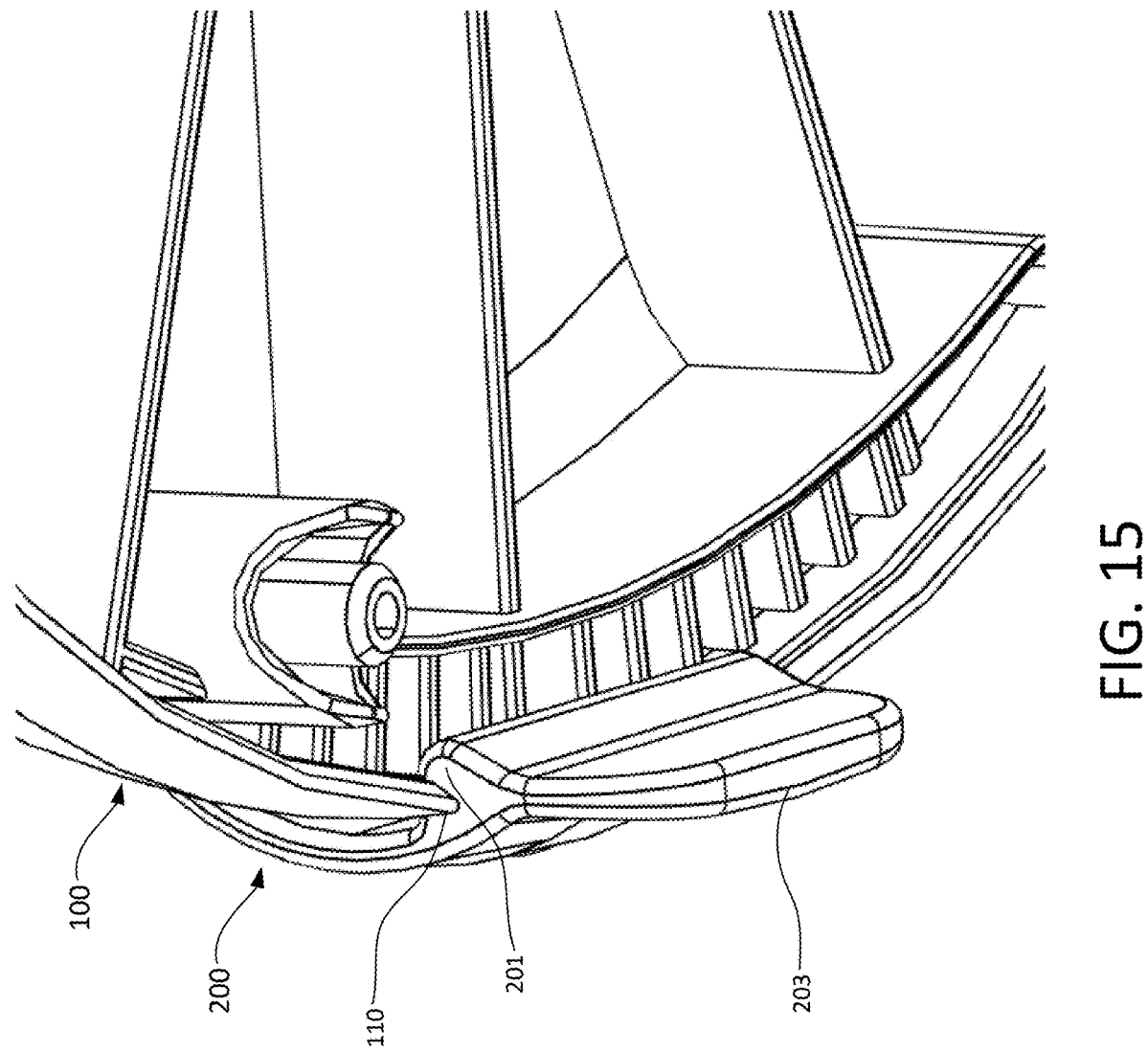
FIG. 15 is a detailed view of an underside of the activity table of FIG. 1.
Figure 16:
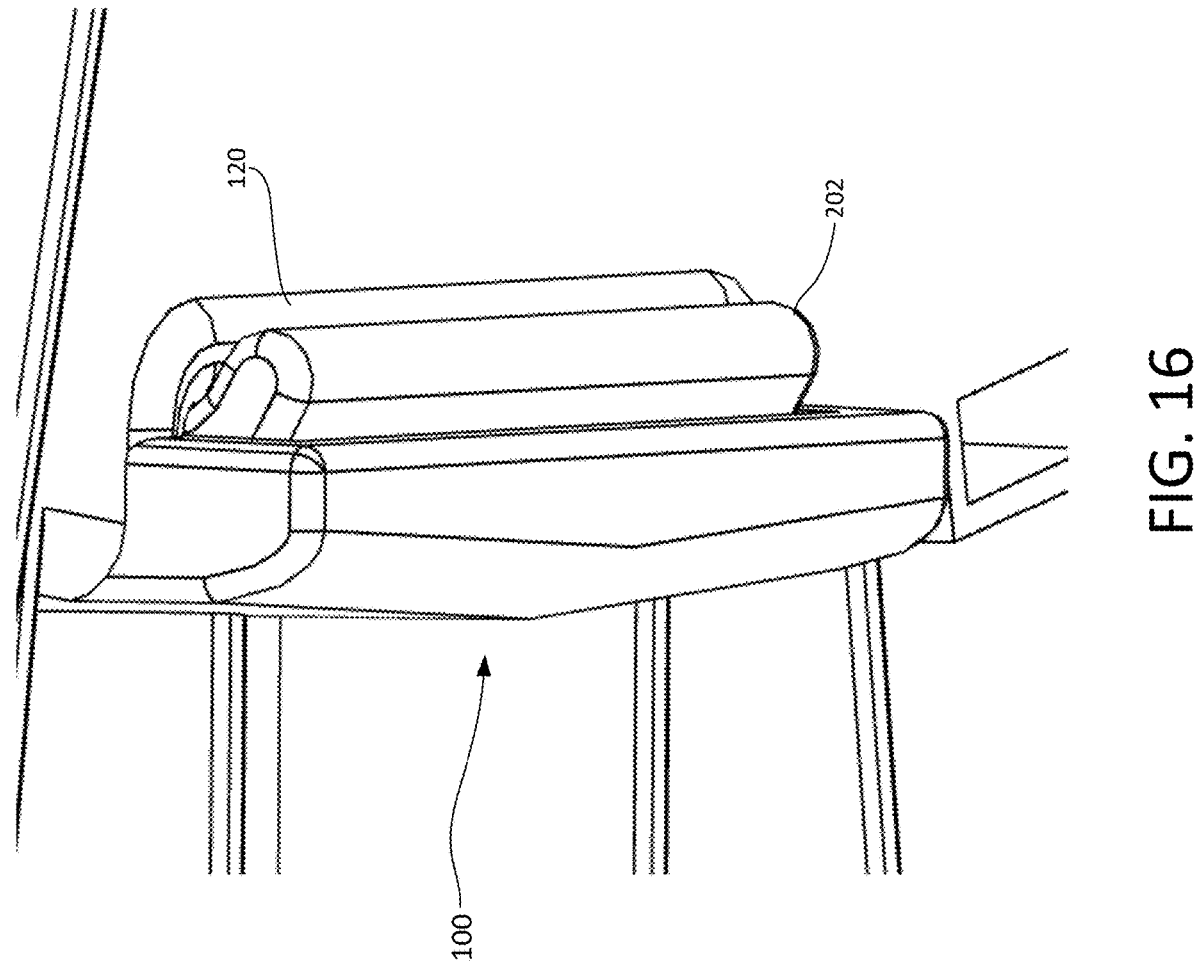
FIG. 16 is a detailed view of an underside of the activity table of FIG. 1.

FIGS. 14-18 are various views of the attachment clip 200 coupled to the activity table 100. FIG. 15 is an underside view highlighting the interaction between the outer portion 200A and the edge of the activity table 100, and shows how the tooth 201 extends into an interior of the activity table 100. In some embodiments, the activity table 100 includes a defined gap 110 sized and shaped to receive a width (e.g., defined by the X-axis of FIG. 6) of the attachment clip 200. FIG. 15 is a second underside view highlighting the interaction between the inner portion 200C and the slot 120 of the activity table.

Figure 19:
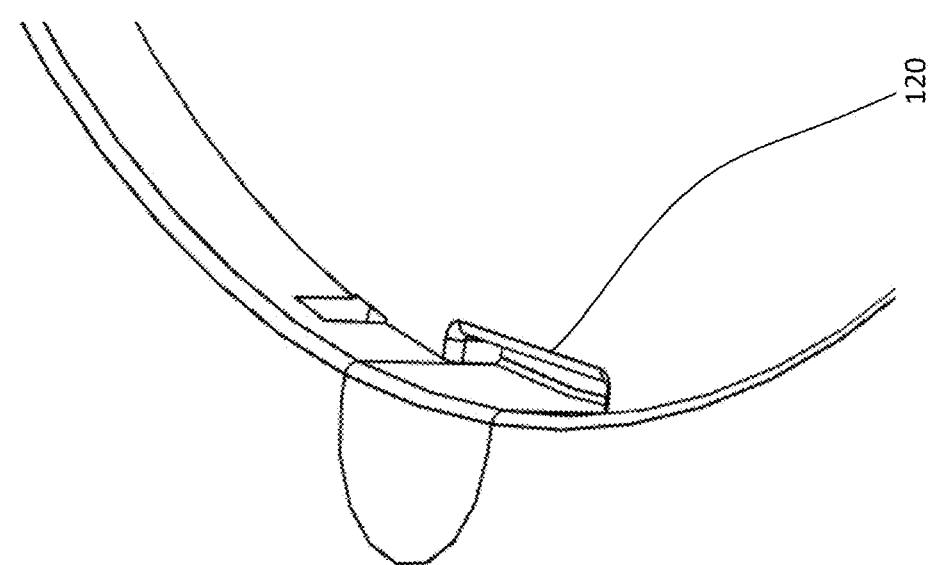
FIG. 19 is a detailed view of the activity table of FIG. 1.
Figure 19:
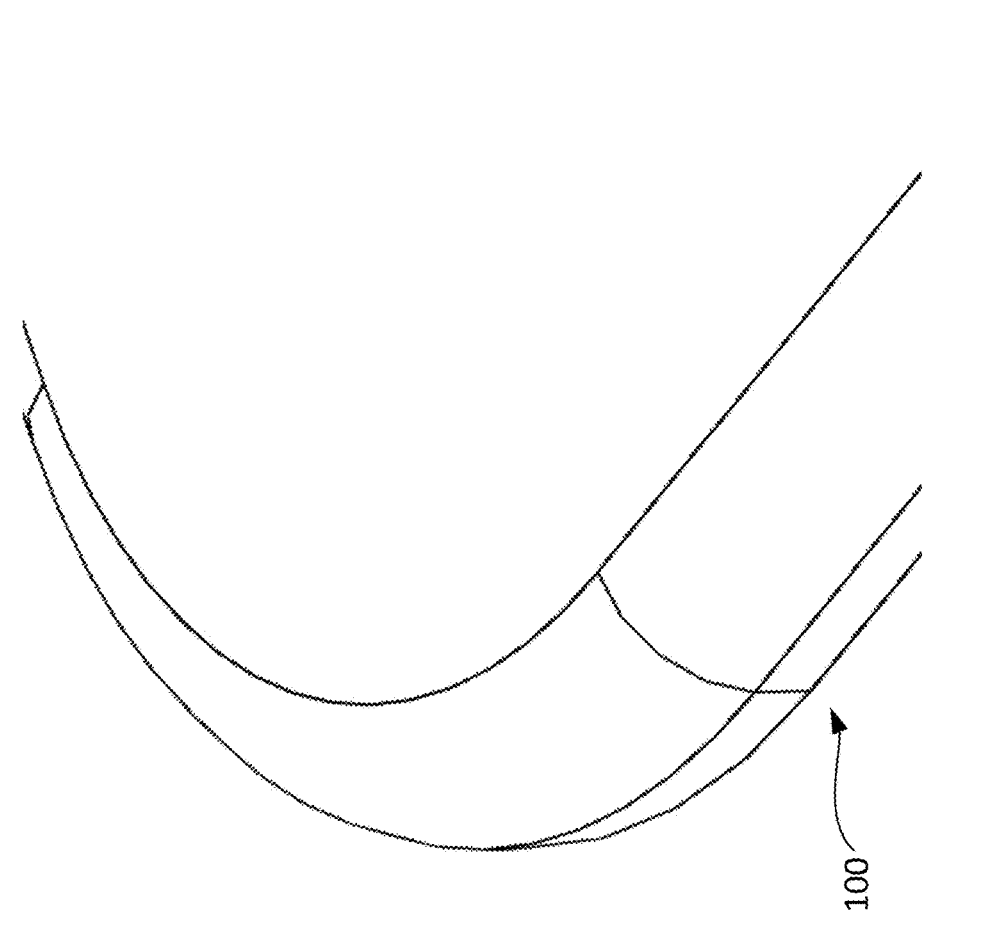
Figure 20:
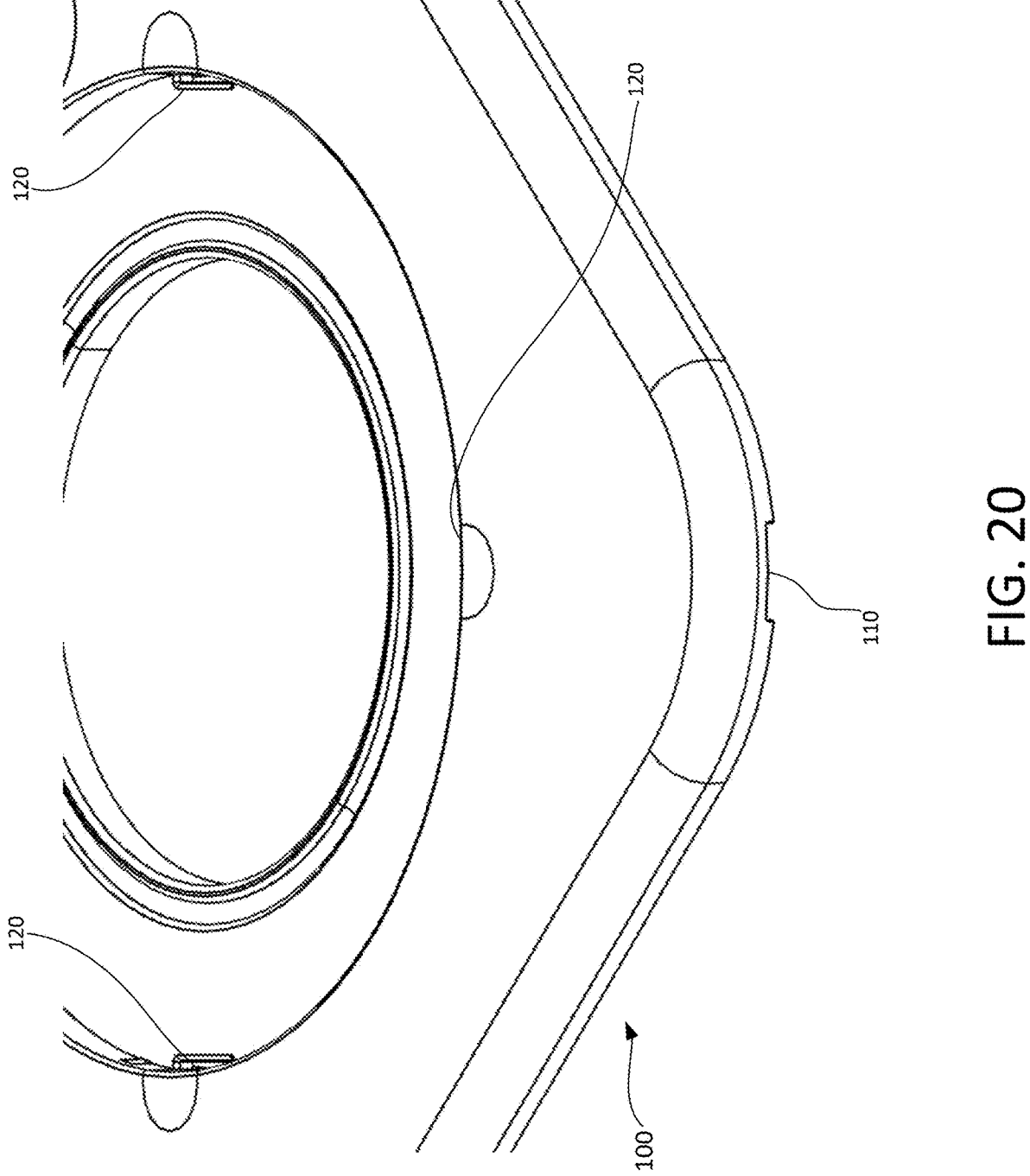
FIG. 20 is a detailed view of the activity table of FIG. 1.
Figure 21:
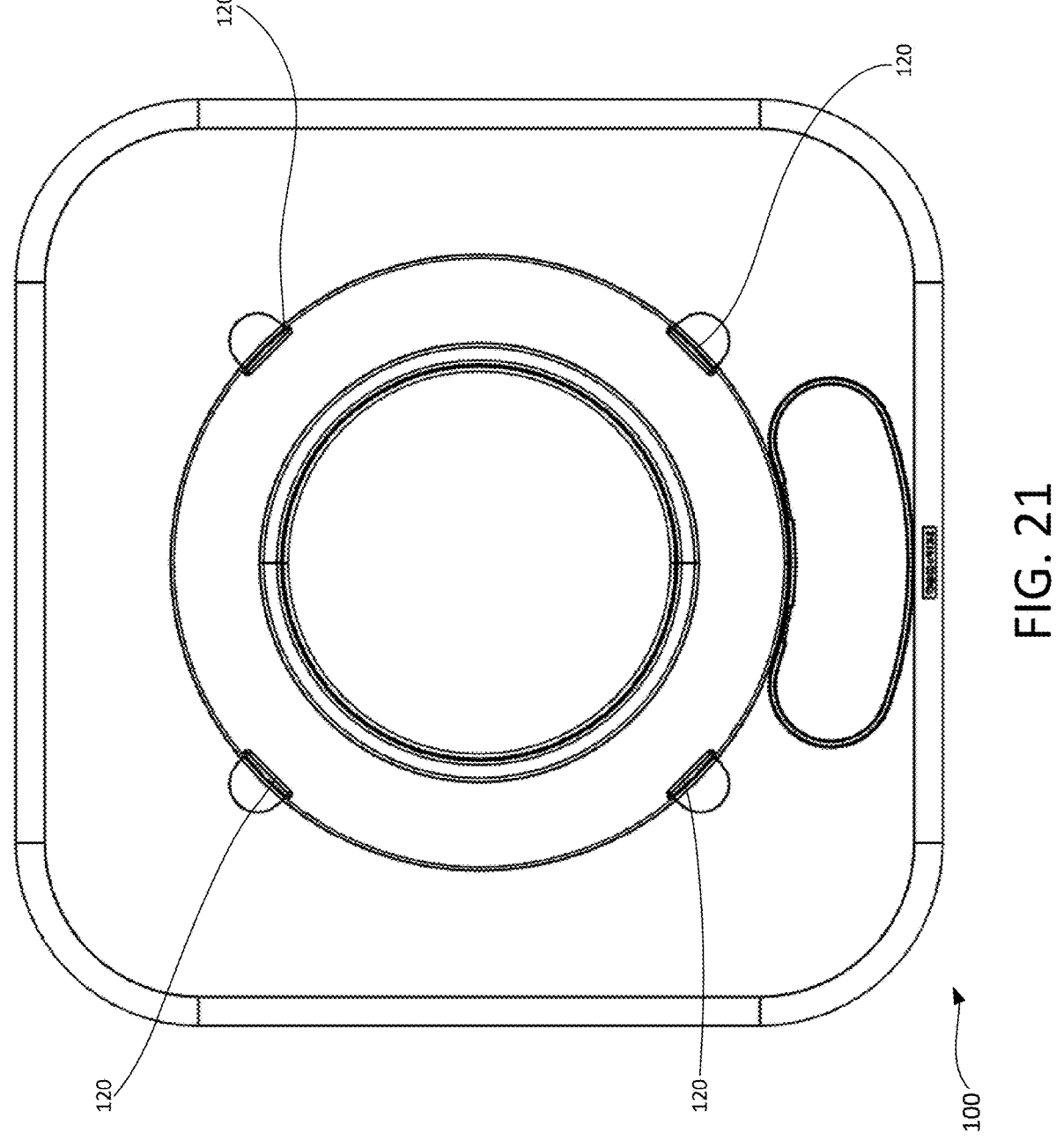
FIG. 21 is a top view of the activity table of FIG. 1.

Each of the gap 110 and the slot 120 may guide a user into positioning of the attachment clip 200, and may restrict movement of the attachment clip 200 along the edge. As described above, the outer portion 200A and the inner portion 200C of the attachment clip 200 restrict movement of the attachment clip along the Y-axis of FIG. 6 (e.g., off of the activity table 100), but movement of the attachment clip 200 along the edge of the activity table 100 (e.g., along the X-axis of FIG. 6) may not be otherwise restricted. Accordingly, the gap 110 and slot 120 may be included to restrict this movement, and to define set positions for the attachment clip 200. As shown in FIGS. 19 and 20, a gap 110 and a slot 120 form a pair, and are positioned along a hypothetical radius defined by a center of the activity table 100 to a corner of the activity table 100. In the embodiment shown in FIG. 21, the activity table 100 includes four such pairs.

Figure 17:
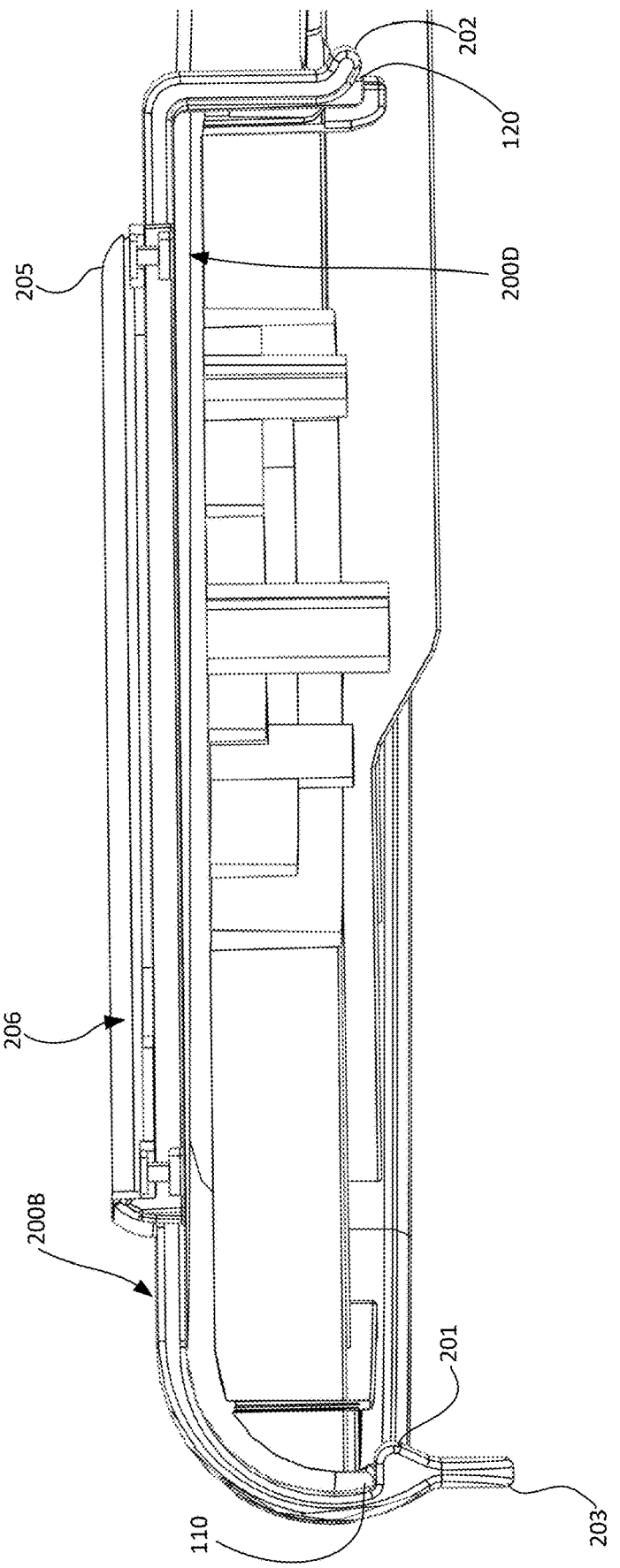
FIG. 17 is a side section view of the attachment clip of FIG. 6.
Figure 18:
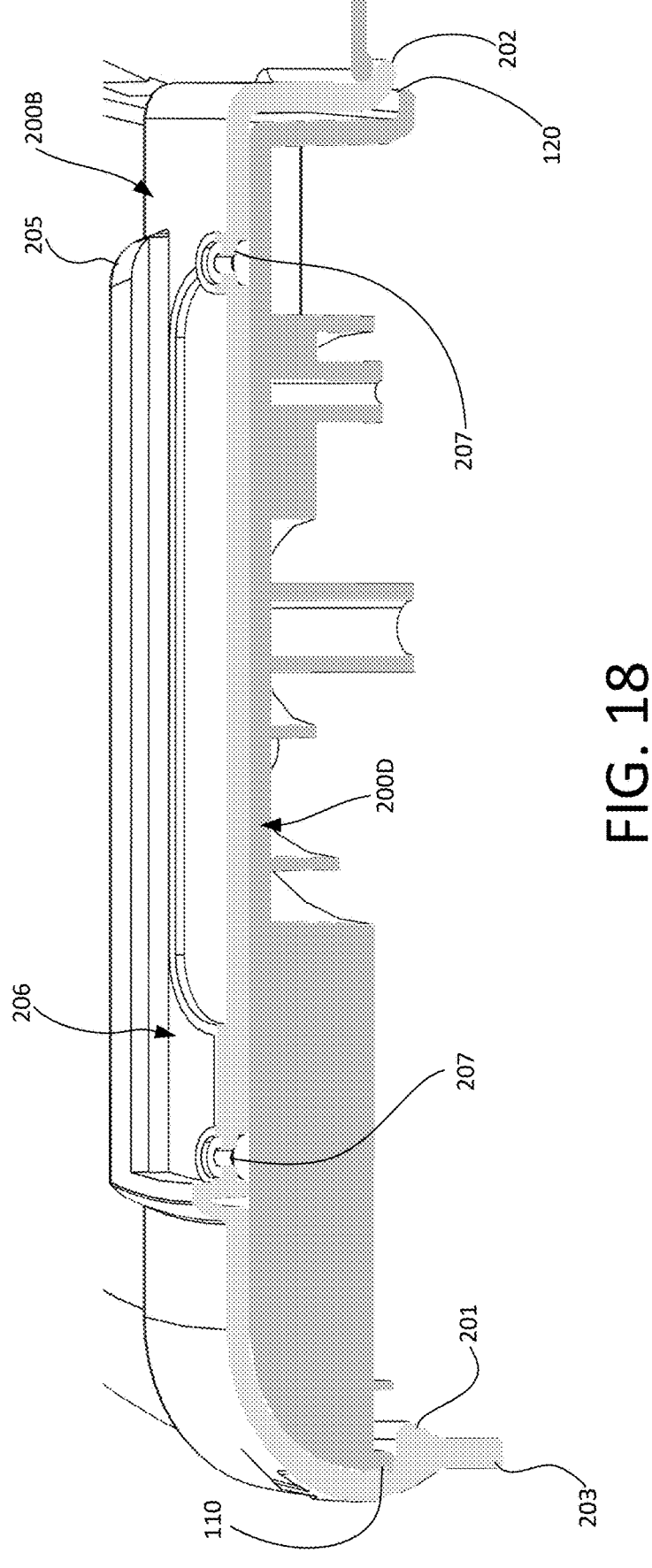
FIG. 18 is a perspective section view of the attachment clip of FIG. 6.

FIGS. 17 and 18 are section views of the activity table 100 and attachment clip 200 interaction taken along line 14 in FIG. 14. The view of FIG. 17 is directly from the side, and the view of FIG. 18 is a perspective view, with the attachment clip 200 shown in a lighter gray than the activity table 100.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An attachment for an activity table, the attachment comprising:
   a clip comprising:
   a first attachment mechanism on a first end;
   a second attachment mechanism on a second end opposite the first end; and
   at least one hole shaped to receive a fastener; and
   an accessory comprising an interactive element and at least one aperture configured to receive the fastener, wherein:
   the first attachment mechanism is configured to insert into a corresponding slot of the activity table, and
   the second attachment mechanism is configured to snap fit to the activity table.

2. The attachment of claim 1, wherein the first attachment mechanism forms a pivot point for the clip when inserted into the corresponding slot.

3. The attachment of claim 2, wherein the first attachment mechanism comprises:
   a flat portion extending in a first direction; and
   a flare portion extending from the flat portion in a second direction different from the first direction, the flare portion configured to insert into the corresponding slot.

4. The attachment of claim 1, wherein the second attachment mechanism comprises a tooth that forms the snap fit by extending into an interior of the activity table.

5. The attachment of claim 4, wherein the second attachment mechanism further comprises a grip that extends in an opposite direction from the tooth and that is configured to receive a user input.

6. The attachment of claim 4, wherein the second attachment mechanism is arcuate to adapt to an edge of the activity table.

7. The attachment of claim 1, wherein the accessory comprises a gap shaped to receive a width of the clip, and wherein the at least one aperture is positioned within the gap.

8. An attachment clip for an activity table, comprising:
   a first member having a top side, a bottom side, a first end and a second end;
   a second member extending from the first end generally in a first direction that is perpendicular the bottom side, the second member comprising:
   a flat portion coupled to the first end extending in the first direction; and
   a flare portion extending from the flat portion in a second direction that is angled away from the bottom side and the first end; and
   a third member extending from the second end, comprising:
   an arcuate portion extending in an arc from the second end generally in the first direction and terminating at a third end; and a catch portion, comprising:
   a shoulder coupled to the third end and extending toward the second end; and
   a release tab extending from the shoulder generally in the first direction.

9. The attachment clip of claim 8, wherein the flare portion of the second member is configured to form a pivot point within a slot of the activity table.

10. The attachment clip of claim 8, wherein the arcuate portion is shaped to snugly fit about an edge of the activity table.

11. The attachment clip of claim 10, wherein the shoulder of the catch portion is shaped to interface with an interior of the edge of the activity table.

12. The attachment clip of claim 8, wherein the top side is configured to receive an accessory.

13. The attachment clip of claim 12, wherein:
   the first member comprises a first aperture;
   the accessory comprises a second aperture; and
   the first aperture and second aperture are configured to receive a fastener in order to couple the accessory to the top side.

14. An attachment clip for an activity table, comprising:
   a main body comprising:
   a top side;
   a bottom side;
   a first end;
   a second end;
   a first edge connecting the first end and the second end;
   a second edge connecting the first end and the second end;
   a first raised portion proximate the first edge;
   a second raised portion proximate the second edge; and
   an aperture passing through the main body from the top side to the bottom side and positioned between the first raised portion and the second raised portion;
   a first attachment mechanism coupled with the first end and extending generally in a first direction perpendicular the bottom side; and
   a second attachment mechanism coupled with the second end and extending generally in the first direction, wherein the first end and the second end cooperate to selectively attach the attachment clip to the activity table.

15. The attachment clip of claim 14, wherein the first attachment mechanism forms a pivot point for the main body when inserted into a corresponding slot on the activity table.

16. The attachment clip of claim 14, wherein the second attachment mechanism comprises:
   an arcuate portion extending in an arc from the second end generally in the first direction and terminating at a third end; and
   a catch portion comprising a tooth coupled to the third end and extending toward the second end.

17. The attachment clip of claim 16, wherein the arcuate portion is shaped to snugly fit an edge of the activity table.

18. The attachment clip of claim 17, wherein the tooth is shaped to interface with an inner portion of the edge.

19. The attachment clip of claim 16, wherein the second attachment mechanism further comprises a release tab extending from the shoulder generally in the first direction.

20. The attachment clip of claim 14, wherein the attachment clip further comprises an accessory, the accessory comprising:

an interactive element on a first side of the accessory;

a gap on a second side of the accessory, the gap shaped to interface with the first raised portion and the second raised portion of the main body; and an accessory aperture configured to align with the aperture of the main body, such that a fastener inserted into the aperture of the main body and the accessory aperture couples the accessory to the main body.

* * * * *